United States Patent
Shirai et al.

[11] Patent Number: 6,037,054
[45] Date of Patent: Mar. 14, 2000

[54] SHEET FOR PROTECTING PAINT FILM

[75] Inventors: Mitsuyoshi Shirai; Tomohide Bamba; Keiji Hayashi; Isao Hirose; Kenji Sano; Toshiyuki Umehara, all of Osaka; Komaharu Matsui, Kanagawa; Takeshi Eda; Hiroshi Ueda, both of Hyogo, all of Japan

[73] Assignees: Nitto Denko Corporation, Osaka; Kansai Paint Co., Ltd., Hyogo, both of Japan

[21] Appl. No.: 08/948,785

[22] Filed: Oct. 10, 1997

[30] Foreign Application Priority Data

Oct. 14, 1996 [JP] Japan .................................. 8-293346

[51] Int. Cl.$^7$ ...................................................... B32B 7/12
[52] U.S. Cl. ........................ 428/356; 428/40.1; 428/41.3; 428/41.7; 428/355 R; 428/355 BL; 428/355 EN
[58] Field of Search ............................ 428/356, 355 BL, 428/355 R, 41.7, 41.3, 40.1, 355 EN

[56] References Cited

U.S. PATENT DOCUMENTS

| | | | |
|---|---|---|---|
| 2,463,452 | 3/1949 | Yule ........................................ 260/31.8 |
| 4,751,121 | 6/1988 | Kühnel et al. ............................. 428/40 |
| 5,127,974 | 7/1992 | Tomiyama et al. ........................ 156/85 |
| 5,434,221 | 7/1995 | White et al. ........................... 525/333.6 |
| 5,464,692 | 11/1995 | Huber .................................. 428/352 X |
| 5,601,917 | 2/1997 | Matsui et al. ............................ 428/356 |
| 5,747,132 | 5/1998 | Matsui et al. .......................... 428/355 EN |

FOREIGN PATENT DOCUMENTS

0519278 A2  12/1992  European Pat. Off. .

*Primary Examiner*—Daniel Zirker
*Attorney, Agent, or Firm*—Sughrue, Mion, Zinn, Macpeak & Seas, PLLC

[57] ABSTRACT

A sheet for protecting paint film comprising a support having formed thereon a rubber adhesive layer comprising an isobutylene polymer having a degree of dispersion of from 1 to 2.3 and a weight average molecular weight of 300,000 to 600,000 (the domain A in the FIGURE) as the base polymer.

The paint film protecting sheet has the compatibility of the prevention of the occurrence of a microdeformation and a good peelability. That is, when an article such as automobiles having a paint film applied with the protecting sheet is placed outdoors for a long period of time at high temperature, the paint film is hard to deform and the sheet can be easily peeled even after adhering for a long period of time.

5 Claims, 1 Drawing Sheet

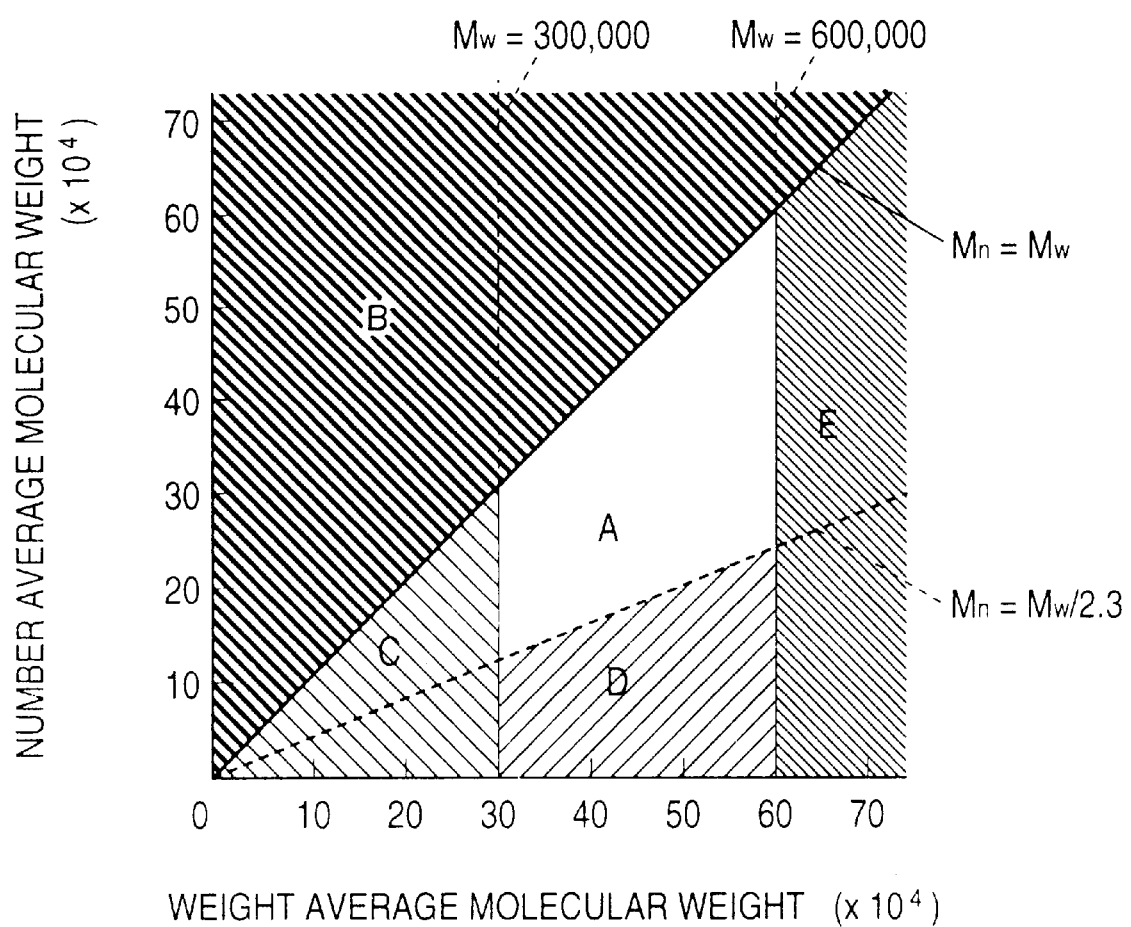

SHEET FOR PROTECTING PAINT FILM

FIELD OF THE INVENTION

The present invention relates to a sheet for protecting a paint film, which is hard to deform paint films, is excellent in the peelability after adhering for a long period of time, and is suitable for the surface protection of bodies and parts of automobiles, coated steel plates, etc.

BACKGROUND OF THE INVENTION

Hitherto, a means for preventing the occurrences of damages, delustering, discoloring, etc., of paint films with floating matters or colliding matters, such as dusts, a rain, pebbles, etc., in the case of loading painted motorcars or the parts thereof, etc., on trucks or ships and transporting them to remote places, such as overseas places, etc., has been desired.

As such a preventive means, a means of coating a wax-series paint film material on the surfaces of the above-described articles or parts at a thickness of from 5 to 20 µm has hitherto been known. However, there are problems such that it is difficult to form a wax paint film at a uniform thickness, whereby a uniform paint film is hard to obtain, the coated paint films are liable to be stained and are easily affected by a rain, a great deal of labor is required to apply the wax paint films and remove thereof, and the use of such wax paint films is liable to induce environmental problems such as the use of solvents, the treatment of waste liquids, etc.

On the other hand, to overcome the above-described problems by a sheet system, various surface protecting sheets of using a pressure-sensitive adhesive layer formed on a support for paint film adhesion are proposed. However, in the uses that the sheet is placed in the open air under high temperature for a long period of time as the case of the use for automobiles wherein the temperature of the roof portion of automobiles is said to reach 80° C. when the automobiles are exposed outdoors in the summer season, there is a problem that it becomes difficult to peel the protecting sheet from a paint film by the deterioration of the strength, flexibility, etc., of the protecting sheet due to ultraviolet rays and the increase of the adhesive force of the protecting sheet with the passage of time.

In view of the above-described circumstance, it is proposed to overcome the problem of lowering the peelability of a protecting sheet after adhering for a long period of time by forming the pressure-sensitive adhesive layer of the protecting sheet with a high molecular weight polyisobutylene. However, in using such a pressure-sensitive layer, a paint film is liable to cause microdeformation with the increase of the molecular weight of the polymer and there is a difficulty that the protecting sheet thus proposed is unsatisfactory in the point of the compatibility of the prevention of the deformation of a paint film and the good peelability of the protecting sheet.

That is, the microdeformation described above means the deformation of a paint film by the adhesion of a protecting sheet and the occurrence of the microdeformation is particularly severe in a soft paint film. For example, in the case of using the protecting sheet for automobiles, when the automobiles are placed outdoors for a long period of time in the summer season, etc., a deformation such as a gap severely occurs in the paint film of the automobiles at the peripheral portion of the protecting sheet, the edges of entrapped air, etc., whereby the microdeformation occurs. The microdeformation is a defect of greatly reducing the commercial value of the automobiles according to the extent of peeling of the paint film, and the protecting sheet causing such a microdeformation is an article losing the fundamental efficiency and does not have a practical value.

SUMMARY OF THE INVENTION

An object of the present invention is to provide a sheet for protecting a paint film, having a compatibility of the prevention of the occurrence of a microdeformation and a good peelability, that is, which is hard to form deformation of the paint film when the article applied with the protecting sheet is placed outdoors under high temperature for a long period of time and can be easily peeled.

According to the present invention, there is provided a sheet for protecting a paint film, the sheet comprising a support having formed thereon a rubber pressure-sensitive adhesive layer comprising an isobutylene polymer having a degree of dispersion of from 1 to 2.3 and a weight average molecular weight of from 300,000 to 600,000 as the base polymer.

An isobutylene polymer wherein the degree of dispersion, that is, weight average molecular weight/number average molecular weight, is from 1 to 2.3 and the weight average molecular weight is from 300,000 to 600,000 is used for the rubber pressure-sensitive adhesive layer of the paint film protecting sheet of the present invention. Therefore, the paint film protecting sheet having the compatibility of the prevention of a microdeformation and a good peelability, that is, having the properties that even when an article such as automobiles having formed thereon a paint film applied with the paint film protecting sheet, is placed outdoors under high temperature for a long period of time, the paint film is hard to be deformed and the protecting sheet can be easily peeled, can be obtained. Also, based on the good peelability and the good weather resistance of the paint film protecting sheet of the present invention, the protecting sheet can be peeled without leaving stains such as adhesive remaining and thus washing of the article after peeling the protecting sheet becomes unnecessary.

BRIEF DESCRIPTION OF THE DRAWING

The FIGURE is of a view explaining the domains of the molecular weight and the degree of dispersion of isobutylene polymers.

DETAILED DESCRIPTION OF THE INVENTION

The present invention is described in detail below.

The sheet for protecting paint film of the present invention comprises a support having formed thereon a rubber pressure-sensitive adhesive layer comprising an isobutylene polymer having a degree of dispersion of from 1 to 2.3 and a weight average molecular weight of from 300,000 to 600,000 as the base polymer. Various polymers such as a homopolymer or a copolymer comprising isobutylene as the component as the isobutylene polymer, in particular, a copolymer containing at least 50 mol % of an isobutylene component, can be used.

Examples of the above-described copolymer which can be preferably used in the present invention include a random copolymer of isobutylene and isoprene, such as a regular butyl rubber, a chlorinated butyl rubber, a brominated butyl rubber, or a partially crosslinked butyl rubber; in particular, the random copolymer having an isoprene content of from 0.5 to 3% by weight; vulcanized products of them, and modified products thereof (products modified by introducing a functional group such as a hydroxy group, a carboxyl group, an amino group, an epoxy group, etc.). In addition, from the point of weather resistance, etc., the homopolymer of isobutylene can be particularly preferably used.

The isobutylene polymer, which is used as the base polymer for the rubber pressure-sensitive adhesive layer in the present invention, has a degree of dispersion of from 1 to 2.3 and a weight average molecular of from 300,000 to 600,000 and is within the domain A in the FIGURE. By using such an isobutylene polymer, the compatibility of the prevention of the occurrence of the microdeformation and the good peelability without adhesive remaining, etc., becomes possible. In a pressure-sensitive adhesive layer using an isobutylene polymer outside the above-described domain as the base polymer, the compatibility of the two requirements described above is impossible and the object of the present invention is not attained.

The degree of dispersion is defined by weight average molecular weight (Mw)/number average molecular (Mn) as described above. Therefore, the domain B in the FIGURE means that the degree of dispersion is less than 1, and is a domain which does not theoretically exist.

The compatibility of the prevention of the occurrence of the microdeformation and the good peelability of not leaving paint film stains such as adhesive remaining is based on the new concept of the pressure-sensitive adhesive layer including the degree of dispersion in the establishment of the weight average molecular weight. That is, the establishment of the weight average molecular weight of from 300,000 to 600,000 aims at balancing the cohesive force and the stress relaxing property. The weight average molecular weight from the point of balancing is preferably from 320,000 to 580,000, more preferably from 350,000 to 550,000, and most preferably from 400,000 to 500,000.

In an isobutylene polymer having the weight average molecular weight of less than 300,000 shown in the domain C in the FIGURE the cohesive force thereof is insufficient, so that the pressure-sensitive adhesive layer formed using the polymer is liable to be deformed and shows a large adhesive force. As a result, the paint film protecting sheet having such a pressure-sensitive adhesive layer is peeled after placing an article applied with the protecting sheet outdoors for a long period of time, paint film stains such as adhesive remaining are liable to form. Also, in an isobutylene polymer having the weight average molecular weight of more than 600,000 shown by the domain E in the FIGURE, the pressure-sensitive adhesive layer formed using such a polymer is poor in the stress relaxing property and the microdeformation is liable to occur.

On the other hand, the establishment of the degree of dispersion of from 1 to 2.3 aims at the improvement of the peelability of the paint film protecting sheet after adhering for a long period of time by limiting the terminal group density of the isobutylene polymer. That is, the present inventors have clarified that the terminal group density of the polymer has a close relationship with the peelability of the protecting sheet and have obtained a new finding that by reducing the terminal group density of the polymer, the peelability of the protecting sheet formed by the polymer after adhering for a long period of time is improved. According to this finding, it is considered that lowering of the peelability of the protecting sheet after adhering for a long period of time is caused by the increase of the adhesive force by the interaction, such as diffusion, of the terminal groups of the polymer and the surface molecules of the paint film under adhesion for a long period of time.

Therefore, by the concept of establishing the weight average molecular weight regardless of the degree of dispersion according to a conventional establishing idea of a pressure-sensitive adhesive layer, there is no indicator relating to the terminal group density, and therefore the compatibility of the prevention of the occurrence of the microdeformation and the good peelability is difficult.

In the polymer having the degree of dispersion exceeding 2.3 shown by the domain D in the FIGURE, the content of a low molecular weight material is high, and the terminal group density becomes also high. Therefore, the peelability of the paint film protecting sheet is poor, and the weather resistance is also lowered. In addition, the number average molecular weight becomes the indicator of the terminal group density of the polymer, and as the value of the number average molecular weight increases, the terminal group density of the polymer decreases.

It can be seen from the FIGURE that in the polymer having the weight average molecular weight of from 300,000 to 600,000, the number average molecular weight satisfying the degree of dispersion of from 1 to 2.3 is from 130,000 to 600,000. From the point of the good peelability, etc., the number average molecular weight of the isobutylene polymer which can be preferably used in the present invention is from 150,000 to 550,000, preferably from 170,000 to 530,000, and more preferably from 200,000 to 500,000, and the degree of dispersion of the polymer is 2.1 or less, preferably 1.9 or less, and more preferably 1.8 or less.

The isobutylene polymer satisfying the conditions of the domain A in the FIGURE can be prepared by an appropriate method capable of controlling the molecular weight distribution. For example, as the preferred method from the point of the preparation efficiency, etc., there are a method of controlling the molecular weight distribution of a polymer prepared by an appropriate method, by a purification method, a polymer scission method, etc.

The purification is, for example, a method of dissolving the isobutylene polymer in an organic solvent, adding a poor solvent to the solution to precipitate high molecular weight materials, and separating the precipitated materials to high molecular weight materials and low molecular weight materials. The purification method can be advantageously used in the case of the polymer having a large degree of dispersion.

On the other hand, as the polymer scission method, an appropriate method capable of forming low molecular weight polymers by scissioning the isobutylene polymer can be employed. The polymer scission treatment of the isobutylene polymer can be carried out by adding a scissioning agent comprising a radical generator to a solid rubber and masticating the solid rubber by a pressure kneader, a bambury mixer, etc., according to the case of an isoprene unit-containing rubber such as a natural rubber or a butyl rubber. The case of a polyisobutylene containing no isoprene unit is also the same as above.

The isobutylene polymer to be subjected to the polymer scission treatment can be generally selected according to the weight average molecular weight. In general, the isobutylene polymer having the weight average molecular weight of from 350,000 to 2,500,000, preferably from 400,000 to 1,500,000, more preferably from 450,000 to 1,000,000, and most preferably from 550,000 to 900,000 is used. There is no particular restriction on the number average molecular weight because the molecular weight is controlled by the polymer scission treatment. As described above, because the polymer scission method is a treatment method of reducing the molecular weight of a polymer, the polymer scission method can be advantageously applied when the weight average molecular weight of a polymer is larger than the desired value.

For the polymer scission treatment, one kind of the isobutylene polymer or two or more kinds of isobutylene polymers each having different monomer components, molecular weight, etc., can be used. Also, the isobutylene polymer(s) can be used as a mixture with other polymer such as a natural rubber.

The extent of lowering the molecular weight by the polymer scission treatment is properly determined according to the desired weight average molecular weight, etc., but usually, the molecular weight is lowered to 90% or lower, and preferably from 10 to 80%, based on the weight average molecular weight before the polymer scission treatment. In addition, the change of the molecular weight of the isobutylene polymer by the polymer scission treatment can be easily known by the measurement with a gel permeation chromatography, etc.

Examples of the radical generator which functions as a scissioning agent in the polymer scission treatment, which can be used, include radical polymerization initiators such as an organic peroxide, or an azo compound; and other appropriate compounds such as organic or inorganic compounds each generating a radical, organic metal compounds, or metal complexes.

Examples of the radical generator generally used include organic peroxides, e.g., ketone peroxides such as methyl ethyl ketone peroxide and acetylacetone peroxide; peroxyketals such as 1,1-bis(t-hexylperoxy)cyclohexane and 2,2-bis(t-butylperoxy)butane; hydroperoxides such as diisopropylbenzene hydroperoxide and cumene hydroperoxide; dialkyl peroxides such as $\alpha,\alpha'$-bis (t-butylperoxy) diisopropylbenzene and dicumyl peroxide; and diacyl peroxides such as 2,4-dichlorobenzoyl peroxide, (3,5,5-trimethylhexanoyl) peroxide, octanoyl peroxide, lauroyl peroxide, stearoyl peroxide, succinic acid peroxide, m-toluoylbenzoyl peroxide, benzoyl peroxide, dipropionyl peroxide, and diacetyl peroxide.

Also, organic peroxides, e.g., peroxy dicarbonates such as di(3-methyl-3-methoxybutyl)peroxy dicarbonate, di-2-methoxybutylperoxy dicarbonate, diisopropylperoxy dicarbonate, di-n-propylperoxy dicarbonate, and di(2-ethoxyethyl)peroxy dicarbonate; and peroxy esters such as t-butylperoxy isobutylate, 1,1,3,3-tetramethylbutylperoxy-2-hexanate, t-butylperoxy neodecanoate, and t-butylperoxy pivalate can be used as the radical generator generally used.

Furthermore, azo compounds such as 2,2'-azobisisobutyronitrile, 2,2'-dichloro-2,2'-azobispropane, 1,1'-azo(methylethyl) diacetate, 2,2'-azoisobutane, 2,2'-azobis(methyl 2-methylpropionate), 2,2'-azobis(2-methylbutyronitrile), 4,4'-azobis(4-cyanovaleric acid), 4,4'-azobis(dimethyl 4-cyanovalerate), 3,5-dihydroxymethylphenylazo-2-methylmalonodinitrile, and 2,2'-azobis(2-methylvaleronitrile) can be used as the radical generator generally used.

In addition, other azo compounds such as 2,2'-azobis(2,4-dimethylvaleronitrile), 2,2'-azobis(2,4-dimethyl-4-methoxyvaleronitrile), 2,2'-azobis(2-hydroxymethylpropionitrile), 1,1'-azobis (cyclohexanenitrile), 1,1'-azobis(cyclohexane-1-carbonitrile), 2,2'-azobis(2-propylbutyronitrile), 1,1'-azobis (1-chlorophenylethane), and 1,1'-azobis(l-phenylethane) can be also used as the radical generator generally used.

Moreover, still other azo compounds such as 1,1'-azobiscumene, ethyl 4-nitrophenylazobenzylcyannoacetate, phenylazodiphenylmethane, phenylazotriphenylmethane, 4-nitrophenylazotriphenylmethane, 1,1'-azobis(1,2-diphenylethane), poly(tetraethylene glycol-2,2'-azobis isobutylate), dimethyl-2,2'-azobis(2-methylpropionate), and 2,2'-azobis[2-(2-imidazoline-2-yl)propane] can be also used as the radical generator generally used.

Furthermore, other organic compounds such as 1,4-bis (pentamethylene)-2-tetrazene, 1,4-dimethoxycarboxyl-1,4-diphenyl-2-tetrazene, benzenesulfonyl azide, etc., can be also used as the radical generator generally used.

The radical generator which can be preferably used from the point of controlling the molecular weight, etc., is a radical generator that the 10 hour half-life temperature in benzene is at least 60° C., and preferably at least 70° C., like diacyl peroxides such as octanoyl peroxide, lauroyl peroxide, stearoyl peroxide, succinic acid peroxide, m-toluoylbenzoyl peroxide, or benzoyl peroxide. In particular, benzoyl peroxide is preferred.

The amount of the radical generator used in the polymer scission treatment by the above-described polymer scission method can be appropriately determined according to the polymer scission treatment speed, etc., but the using amount is generally from 0.01 to 20 parts by weight, preferably from 0.05 to 10 parts by weight, and more preferably from 0.1 to 5 parts by wight, per 100 parts by wight of the isobutylene polymer.

By controlling the kind and the using amount of the radical generator, the temperature and the time of the polymer scission treatment, etc., the average molecular weight of the polymer scission product of the isobutylene polymer obtained can be controlled. The average molecular weight of the isobutylene polymer relates not only to the prevention of the occurrence of the microdeformation and the peelability of the protecting sheet but also to the heat resistance, the weather resistance, etc., of the protecting sheet. Thus, according to the desired characteristics of the paint film protecting sheet, the average molecular weight can be appropriately controlled.

In the case of the polymer scission treatment, a decomposition speed controlling agent of the radical generator, etc., can be added. For example, for accelerating the decomposition speed of the radical generator, the addition of various reducing agents or amine compounds, such as N,N-dimethylaniline, triethylamine, tributylamine, etc., is effective.

Also, for delaying the speed of the polymer scission reaction or stopping the polymer scission reaction, a polymerization inhibitor or a polymerization prohibitor, such as p-benzoquinone, diphenylamine, hydroquinone, p-tert-butyl catechol, etc., can be added.

The paint film protecting sheet of the present invention can be formed by forming a rubber pressure-sensitive adhesive layer comprising an isobutylene polymer having a degree of dispersion of from 1 to 2.3 and a weight average molecular weight of from 300,000 to 600,000 prepared by an appropriate method as the base polymer, on a support. In the formation of the rubber pressure-sensitive adhesive layer, if necessary, appropriate additives known in conventional pressure-sensitive adhesives, such as polymers, a tackifier, a softening agent, a stabilizer, a pigment, a filler, an antioxidant, an ultraviolet absorber, etc., can be added to the base polymer.

Incidentally, the polymers and the tackifier described above are compounded for controlling the adhesive characteristics such as the control of the average molecular weight.

The polymers described above include, for example, the unscissioning products of the isobutylene homopolymer, the isobutylene-isopropylene random copolymer, the vulcanized products of them, the modified products of them, etc.; poly-(meth)acrylic acid esters, polybutadiene, polystyrene, polyisoprene, poly α-olefins, natural rubbers, polyesters, polyurethane, polyacrylonitrile, and polyamide. From the point of the weather resistance, the use of the isobutylene homopolymer is particularly preferred.

Also, the tackifier includes, for example, epoxy resins and coumarone-indene resins. The softening agent includes, for example, a process oil and petroleum softening agents. Also, the filler or the pigment includes, for example, calcium oxide, magnesium oxide, titanium oxide, silica, and zinc oxide.

The formation of the sheet for protecting paint film of the present invention can be carried out according to a conventional formation method of adhesive sheets, for example, by a method of coating a solution of the pressure-sensitive adhesive in a proper solvent such as toluene, hexane, cyclohexane, butane, etc., or a hot-melt liquid of the pressure-sensitive adhesive, on a support, or a method of transferring the pressure-sensitive adhesive layer formed on a separator onto a support.

The thickness of the rubber pressure-sensitive adhesive layer formed may be appropriately determined, but the thickness is generally 100 μm or less, preferably from 1 to 50 μm, and more preferably from 3 to 20 μm. The pressure-sensitive adhesive layer formed is, if necessary, protected by temporarily adhering thereon a separator before the practical use.

As the support for supporting the rubber pressure-sensitive adhesive layer, an appropriate material may be used. Generally, films of plastics, for example, polyolefins such as polyethylene, polypropylene, a blend of them, etc.; polyvinyl chloride, and polyester; porous films having a gas permeability, etc.; papers, nonwoven fabrics, etc., are used. The thickness of the support is generally from 5 to 300 μm, preferably from 10 to 200 μm, and more preferably from 20 to 100 μm, although the thickness thereof is not limited to the values.

If necessary, a corona treatment, an undercoat treatment, etc., can be applied onto the support for improving the adhesion with the pressure-sensitive adhesive layer. Also, for forming a wound protecting sheet which can be easily unwound, a coat layer comprising an appropriate releasing agent, such as a silicone releasing agent, a long chain alkyl releasing agent, or a fluorine releasing agent, can be formed on the back surface of the support. Furthermore, appropriate additives such as a filler, an ultraviolet stabilizer, an antioxidant, a slipping agent, or an antistatic agent may be compounded with the support.

Incidentally, a filler such as titanium oxide can be compounded with the support for imparting thereto a hiding property. There is no particular restriction on the compounding amount of the filler. However, from the points of the hiding power and the film-forming property, the compounding amount of the filler is preferably from 5 to 20% by weight, and more preferably from 8 to 15% by weight. Also, there is no restriction on the compounding amounts of the ultraviolet stabilizer and the antioxidant, but from the compounding effects of them and the scattering protection of them at film forming, the compounding amounts of them are preferably from 0.1 to 5% by weight, and more preferably from 0.15 to 3% by weight. In addition, as the ultraviolet stabilizer and the antioxidant, known materials for conventional pressure-sensitive adhesives can be appropriately used. Incidentally, examples of the ultraviolet stabilizer include a benzotriazole compound, a hindered amine compound, and a benzoate compound.

The sheet for protecting paint film of the present invention is preferably used for protecting the surfaces of adherends such as the bodies and the parts of automobiles, metal plates such as steel plates, etc., and the shaped articles thereof, etc., each coated with a paint film, such as a polyester-melamine paint film, an alkyl-melamine paint film, an acryl-melamine paint film, an acryl-urethane paint film, and epoxy group-containing acryl-polyacid paint film, from the collision of fine substances, chemicals, etc. In particular, the paint film protecting sheet of the present invention can be advantageously used when a temperature increase is accompanied in the cases of outdoor transportation, etc., when the protecting sheet is adhered for a long period of time, and when the protecting sheet is adhered to a soft paint film in a semi-completely curing treatment state and the paint film is completely cured under the curing condition thereof.

The following examples are intended to illustrate the present invention more practically but not to limit the invention in any way. All parts in these examples, unless otherwise indicated, are by weight.

EXAMPLE 1

100 Parts of polyisobutylene (homopolymer, and hereinafter the same) having a polystyrene-converted weight average molecular weight by gel permeation chromatography (hereinafter the same) of 800,000 and 1.2 parts of a mixture (Nyper BW, trade name, manufactured by NOF Corporation) of 75% by weight of benzoyl peroxide and 25% by weight of water were introduced into a pressure kneader, and the resulting mixture was subjected to polymer scission treatment for 6 hours while maintaining the mixture at 100° C. to obtain a polymer scission product of polyisobutylene having a weight average molecular weight of 500,000 and a number average molecular weight of 300,000 (degree of dispersion: 1.67).

The gel permeation chromatography was performed using by connecting in series 4 columns each having an inside diameter of 7.8 mm and a length of 30 cm (TSK gel $GMH_{HR}$-H, $G4000H_{HR}$, $G3000H_{HR}$, and $G2000H_{HR}$, trade names, manufactured by TOSOH CORPORATION) by HLC-802A (trade name, manufactured by TOSOH CORPORATION) and using tetrahydrofuran as an eluent, under the conditions of a flow rate of 1 ml/minute, a temperature of 40° C., a sample concentration of a 0.1% tetrahydrofuran solution, and a sample injection amount of 500 μm, and a differential refractometer was used as a detector. Also, for the preparation of calibration curve of a molecular weight, TSK standard polystyrene (manufactured by TOSOH CORPORATION) was used.

A solution of 100 parts of the above polymer scission product of the polybutylene dissolved in 400 parts of n-heptane was coated on a film having a thickness of 40 μm formed by extrusion molding a mixture of 92.7 parts of block polypropylene having MFR of 4 g/10 minutes, 7 parts of titanium oxide, and 0.3 part of 2-(3-t-butyl-5-methyl-2-hydroxyphenyl)-5-chlorobenzotriazole by a T die method, and dried at 80° C. for 3 minutes to obtain a sheet for protecting paint film, having a pressure-sensitive adhesive layer having a thickness of 15 μm.

The MFR was measured by A method according to JIS K 7210 under the conditions of a temperature of 230° C. and a load of 21.18 N.

EXAMPLE 2

60 Parts of polyisobutylene having a weight average molecular weight of 800,000, 40 parts of polyisobutylene having a weight average molecular weight of 650,000, and 1.0 part of α,α'-bis(t-butylperoxy)diisopropylbenzene (Perbutyl P, trade name, manufactured by NOF Corporation) were introduced into a twin roll, and a polymer scission treatment was performed at 160° C. for 10 minutes. The polymer scission was stopped by adding 1.0 part of p-tert-butylcatechol to obtain the polymer scission product of the polyisobutylene having a weight average molecular weight of 380,000 and a number average molecular weight of 230,000 (degree of dispersion: 1.65). Using the polymer scission product, a sheet for protecting paint film was obtained in the same manner as in Example 1.

EXAMPLE 3

100 Parts of polyisobutylene having a weight average molecular weight of 1,000,000 and 1.0 part of dicumyl peroxide (Parkmil D, trade name, manufactured by NOF Corporation) were introduced into a pressure kneader. The resulting mixture was subjected to a polymer scission treatment at 120° C. for 6 hours to obtain a polymer scission product of the polyisobutylene having a weight average molecular weight of 600,000 and a number average molecular weight of 360,000 (degree of dispersion: 1.67). Using the polymer scission product, a sheet for protecting paint film was obtained in the same manner as in Example 1.

EXAMPLE 4

100 Parts of polyisobutylene having a weight average molecular weight of 800,000 and a number average molecular weight of 460,000 (degree of dispersion: 1.74) were dissolved in 900 parts of n-heptane, and methanol was added to the resulting solution to re-precipitate high molecular wight materials. The precipitates were removed by filtration. The solution thus obtained was purified to obtain a solution containing the polyisobutylene having a weight average molecular weight of 480,000 and a number average molecular weight of 310,000 (degree of dispersion: 1.55). Using the solution obtained, a sheet for protecting paint film was obtained in the same manner as in Example 1.

COMPARATIVE EXAMPLE 1

A solution of 100 parts of polyisobutylene having a weight average molecular weight of 800,000 and a number average molecular weight of 460,000 (degree of dispersion: 1.74) dissolved in 700 parts of n-heptane was obtained. Using the solution obtained, a sheet for protecting paint film was obtained in the same manner as in Example 1.

COMPARATIVE EXAMPLE 2

A solution of 100 parts of polyisobutylene having a weight average molecular weight of 360,000 and a number average molecular weight of 150,000 (degree of dispersion: 2.4) dissolved in 700 parts of n-heptane was obtained. Using the solution obtained, a sheet for protecting paint film was obtained in the same manner as in Example 1.

COMPARATIVE EXAMPLE 3

A solution of polyisobutylene having a weight average molecular weight of 470,000 and a number average molecular weight of 60,000 (degree of dispersion 7.83) was obtained by dissolving 50 parts of polyisobutylene having a weight average molecular weight of 800,000 and 50 parts of polyisobutylene having a weight average molecular weight of 90,000 in 700 parts of n-heptane. Using the solution obtained, a sheet for protecting paint film was obtained in the same manner as in Example 1.

EVALUATION TEST

About the paint film protecting sheets obtained in the examples and the comparative examples described above, the following evaluations were performed.

Microdeformation:

Each paint film protecting sheet was adhered to a plate having a polyester-melamine paint film having a glass transition temperature (Tg) of 60° C. (paint film A) or 90° C. (paint film B) at room temperature so as to entrap air bubbles and creases. Each plate was allowed to stand for 24 hours in an atmosphere of 80° C. After taking out of the atmosphere and allowing to stand the plate at room temperature for 3 hours, the paint film protecting sheet was peeled. Gap at the portions of the air bubbles and the creases entrapped on the surface of the paint film was measured. The result was evaluated by the following ranks.

| | |
|---|---|
| Excellent: | No gap, or gap of 0.1 μm or less |
| Good: | Gap of from more than 0.1 μm to 0.5 μm |
| Poor: | Gap of from more than 0.5 μm to 1.0 μm |
| Bad: | Gap of more than 1.0 μm |

Stain With the Passage of Time:

Each paint film protecting sheet was adhered at room temperature to a plate having the polyester-melamine paint film A having Tg of 60° C. The plate was placed in a Sunshine Carbon Weather Meter (manufactured by Suga Shikenki K.K.) for 1,000 hours according to JIS D 0205, and the paint film protecting sheet was then peeled. The presence of the adhesive remaining and other stains on the surface of the paint film was determined.

Peelability After Adhering for Long Period of Time (Weather Resistance):

Each paint film protecting sheet was adhered to a coated square plate of 1 m×1 m having an acryl-melamine paint film at 23° C. After exposing the plate outdoors for 6 months, the paint film protecting sheet was peeled. Releasing workability in this case was evaluated by the following ranks.

Excellent: Sheet was smoothly peeled without adhesive remaining.

Poor: Sheet was smoothly peeled, but adhesive remaining occurred at the edge portion of the sheet.

Bad: Adhesive force was very large, adhesive remaining occurred, and peeling the sheet was difficult.

The results obtained are shown in the Table below.

TABLE

|  | Example | | | | Comparative Example | | |
| --- | --- | --- | --- | --- | --- | --- | --- |
|  | 1 | 2 | 3 | 4 | 1 | 2 | 3 |
| Microdeformation | | | | | | | |
| Paint film A | Good | Good | Good | Good | Bad | Good | Good |
| Paint film B | Excellent | Excellent | Excellent | Excellent | Poor | Excellent | Excellent |
| Stain with the passage of time | No | No | No | No | No | Found | Found |
| Peelability | Excellent | Excellent | Excellent | Excellent | Excellent | Poor | Bad |

It can be seen from the results shown in the above Table that in Comparative Example 1 wherein the weight average molecular weight exceeds 600,000, the microdeformation is liable to occur, in Comparative Examples 2 and 3 wherein the degree of dispersion exceeds 2.3, stains such as the adhesive remaining are liable to form by adhering for a long period of time, and in Comparative Example 3 wherein the degree of dispersion is particularly large, the sample is poor in the weather resistance and it is difficult to peel the sheet when exposing for a long period of time.

On the other hand, it can be seen that in the examples of the present invention wherein the samples satisfy the weight average molecular weight of from 300,000 to 600,000 and the degree of dispersion of from 1 to 2.3, the occurrence of the microdeformation is prevented and each sample can be smoothly peeled without forming stains such as adhesive remaining even after exposing for a long time. This is considered to be due to that a sharp molecular weight distribution containing no low molecular weight materials which lower the weather resistance is attained under an appropriate weight average molecular weight which prevents the microdeformation.

While the invention has been described in detail and with reference to specific embodiments thereof, it will be apparent to one skilled in the art that various changes and modifications can be made therein without departing from the spirit and scope thereof.

What is claimed is:

1. A sheet for protecting paint film, the sheet comprising a support having formed thereon a rubber pressure-sensitive adhesive layer comprising an isobutylene polymer having a degree of dispersion of from 1 to 2.3 and a weight average molecular weight of from 300,000 to 600,000.

2. A sheet for protecting paint film of claim 1, wherein the number average molecular weight of the isobutylene polymer is from 130,000 to 600,000.

3. A sheet for protecting paint film of claim 1, wherein the isobutylene polymer is a polymer scission treated product with a radical generator.

4. A sheet for protecting paint film of claim 3, wherein the polymer scission product is formed using a radical generator having a 10 hour half-life temperature in benzene of at least 60° C.

5. A sheet for protecting paint film of claim 3, wherein the radical generator is benzoyl peroxide.

* * * * *